United States Patent [19]

Takeuchi

[11] Patent Number: 5,377,924
[45] Date of Patent: Jan. 3, 1995

[54] EXTENDED COVER FOR A COVER TYPE FISHING REEL

[75] Inventor: Shinji Takeuchi, Tokyo, Japan

[73] Assignee: Daiwa Seiko, Inc., Tokyo, Japan

[21] Appl. No.: 168,395

[22] Filed: Dec. 17, 1993

Related U.S. Application Data

[63] Continuation of Ser. No. 864,945, Apr. 7, 1992, abandoned.

[30] Foreign Application Priority Data

Apr. 11, 1991 [JP] Japan ..................... 3-032376[U]

[51] Int. Cl.⁶ .............................................. A01K 89/01
[52] U.S. Cl. .................................. 242/238; 242/311
[58] Field of Search ............... 242/238, 239, 240, 311

[56] References Cited

U.S. PATENT DOCUMENTS

| | | | |
|---|---|---|---|
| 3,554,459 | 1/1971 | Matsui | 242/239 |
| 3,697,011 | 10/1972 | Christensen et al. | 242/240 X |
| 4,156,510 | 5/1979 | Hull | 242/240 |
| 4,637,569 | 1/1987 | Swisher | 242/239 |
| 4,722,491 | 2/1988 | Myojo | 242/311 |
| 4,961,547 | 10/1990 | Peterson et al. | 242/311 X |
| 5,318,242 | 6/1994 | Kirby et al. | 242/238 |

FOREIGN PATENT DOCUMENTS 57-44856 10/1982 Japan.
64-6054 2/1989 Japan.

*Primary Examiner*—Daniel P. Stodola
*Assistant Examiner*—Michael R. Mansen
*Attorney, Agent, or Firm*—Longacre & White

[57] ABSTRACT

An extended cover (11), in the shape of a deep bowl, is disconnectably mounted on a reel casing (1) such that an axial distance (A) from a rotor (4) to a fishing line guide hole (10) is greater than the axial dimension (B) of the rotor (4). Consequently, a fishing line (20) moving between an outer periphery of the rotor (4) and the fishing line guide hole (10) makes smaller bends. This increases the flying range and simultaneously reduces wear on the fishing line (20.)

1 Claim, 2 Drawing Sheets

EXTENDED COVER FOR A COVER TYPE FISHING REEL

This is a continuation of application Ser. No. 07/864,945, filed Apr. 7, 1992, which has abandoned upon the filing hereof.

BACKGROUND OF THE INVENTION

1. Field of the Invention

The present invention relates to a cover type fishing reel.

2. Description of Related Art

Japanese examined utility model publication Nos. 57-44856 and 64-6054 disclose a conventional cover type fishing reel. After the fishing line has been released in a conventional cover type fishing reel, the fishing line is gripped by pressing a slidable rotor forward to sandwich the fishing line between a leading part of the rotor and an inside portion of the front cover.

There are several disadvantages with a conventional cover type fishing reel. For instance, after releasing the grip on the fishing line, to enable the fishing line to pay out, the fishing line must pass through a fishing line guide hole at the center of the distal end of the cover. Because the fishing line is being paid out around an outer peripheral part of the rotor, it is forced to abruptly change its course several times as it moves between the outer periphery of the rotor and the fishing line guide hole. Each abrupt course change increases the friction resisting the fishing line being paid out, thereby reducing the flying range of the fishing line and causing more wear on the fishing line.

SUMMARY OF THE INVENTION

An object of the present invention is to overcome the aforementioned disadvantage by providing an extended cover on a cover type fishing reel. This reduces the friction on the fishing line, increasing the flying range of the fishing line and extending the life of the fishing line by reducing wear.

A cover type fishing reel according to the present invention comprises a reel casing, an extended cover disconnectably mounted on the reel casing, and a rotor supported for movement within a pocket formed by the reel casing and the extended cover. The extended cover is formed in the shape of a deep bowl with the fishing line guide hole positioned in the "bottom" of the deep bowl and an annular fishing line engaging part projecting from an inside portion of the extended cover. The fishing line engaging part confronts a fishing line pressing part disposed on a leading surface of the rotor to grip the fishing line therebetween. The rotor is supported in the pocket such that the distance, measured along the axis of rotor, between the rotor and the fishing line guide hole is greater than the axial dimension of the rotor. The arrangement of the present invention eases the abruptness of the course changes the fishing line experiences as it moves between the outer periphery of the rotor and the fishing line guide hole.

The annular fishing line engaging part may be formed integrally with the extended cover or as a separate member, and may be flat or tubular.

Since the extended cover according to the present invention is formed in the shape of a deep bowl, the fishing line guide mole is substantially displaced from the rotor so that the fishing line makes no bends greater than 45°. Therefore, the present invention substantially reduces pay out friction, increases the flying range of the fishing line, diminishes wear on the fishing line and improves the durability of the fishing line compared with a conventional cover type fishing reel.

BRIEF DESCRIPTION OF THE DRAWINGS

Other features and advantages of the present invention will be apparent from the following description in conjunction with the accompanying drawings wherein.

DESCRIPTION OF THE PREFERRED EMBODIMENTS

Figure 1:
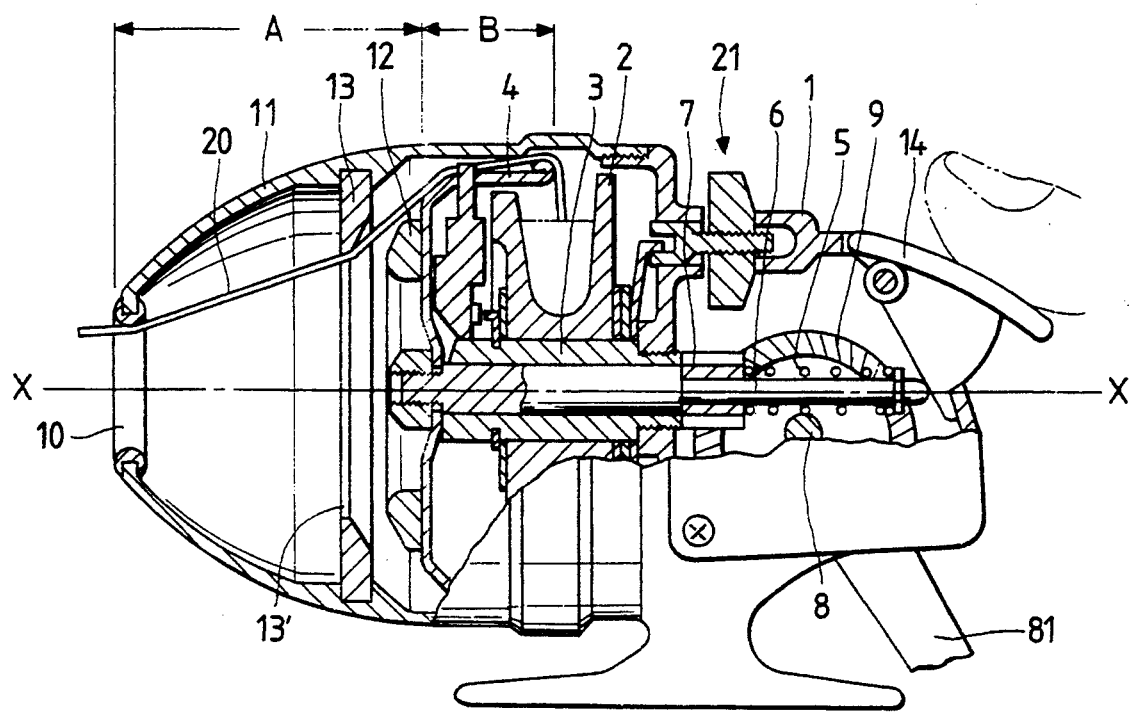
FIG. 1 is a partial sectional elevation view of a cover type fishing reel according to the present invention.
Figure 2:
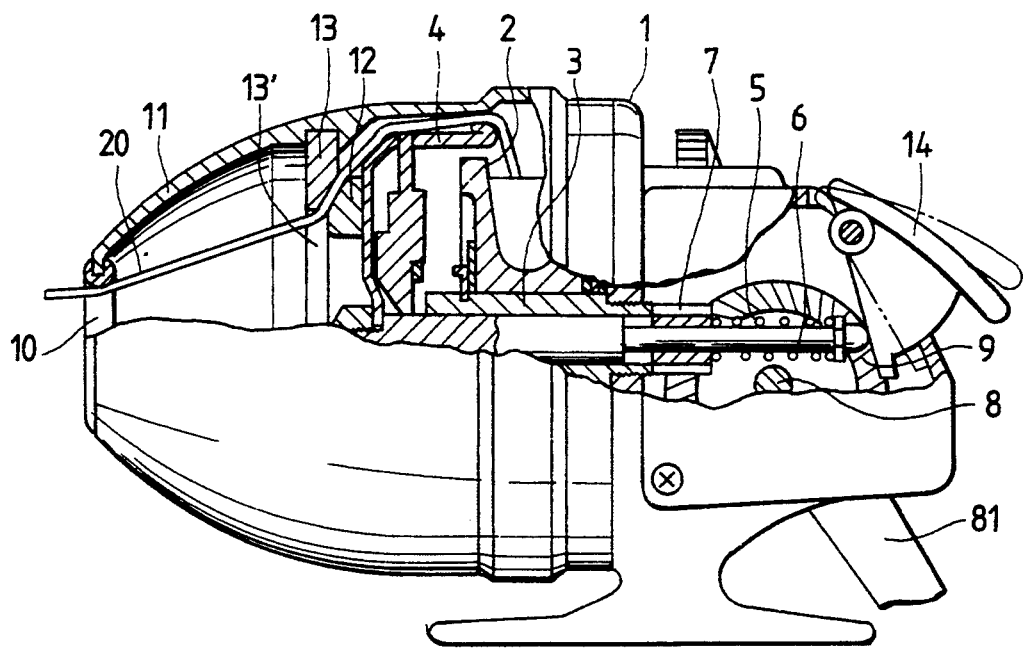
FIG. 2 is a partial sectional elevation view showing a fishing line gripped according to the present invention.

FIGS. 1 and 2 show a cover type fishing reel including a reel casing 1. A spool 2 is rotatably supported on an elongated tube 3 fixed to the reel casing 1. A drag mechanism 21 resists rotation of the spool 2 with respect to the reel casing 1 and elongated tube 3. An axle 6 is supported for rotation about an axis X—X by the elongated tube 3. Further, the axle 6 is translatable along the axis X—X with respect to the elongated tube 3. A rotor 4 is fixed to an end of the axle 6 for movement therewith.

The axle 6 is rotated by a pinion 7. The pinion 7 is translatable, but not rotatable with respect to the axle 6. A ring gear 9 is drivingly engaged with the pinion 7 and fixed to a handle shaft 8. The handle shaft 8 is fixed to a handle 81 such that rotation of the handle 81 causes rotation of the handle shaft 8 and the ring gear 9, which in turn causes rotation of the pinion 7 and the axle 6.

The axle 6 is translated by a pressing knob 14 which is pivotally mounted on the reel casing 1 and contiguous with the axle 6. A spring 5 biases the axle 6, the rotor 4 and the pressing knob 14 toward a winding configuration. In the winding configuration, the pressing knob 14 projects from the reel casing 1 and rotation of the handle 81 causes a fishing line 20 to be wound upon the spool 2. Depressing the pressing knob 14 causes the axle 6 and rotor 4 to be translated with respect to the reel casing 1.

An extended cover 11 is disconnectably mounted on the reel casing 1. Together, the extended cover and the reel casing 1 form a pocket in which the rotor 4 is movable. The extended cover 11 includes a fishing line guide hole 10 which is aligned with the axis X—X and distal from the reel casing 1. The distance A between the rotor 4 and the fishing line guide hole 10 is greater than the axial dimension B of the rotor 4, and the diameter of the fishing line guide hole 10 is greater than the internal diameter of the elongated tube 3.

An annular fishing line engaging part 13 projects into the pocket from an inside portion of the extended cover 11. The fishing line engaging part defines an aperture 13' with a diameter greater than the fishing line guide hole 10. The fishing line engaging part 13 may be formed integrally with the extended cover or as a separate member. The fishing line engaging part 13 may be shaded like a flat annular member as shown in FIGS. 1 and 2. The annular fishing line engaging part 13 contacts the fishing line 20 between the fishing line guide hole 10 and the rotor 4.

A fishing line pressing part 12 is disposed on the leading surface of the rotor 4. The fishing line pressing part 12 is aligned with and confronts the fishing line engaging part 13 with the fishing line 20 extending therebetween. Depressing the pressing knob 14 causes translation of the axle 6 and the rotor 4, which in turn causes the fishing line pressing part 12 to be translated to abut the fishing line engaging part 13, thereby gripping the fishing line 20 therebetween.

By extending the distance A between the rotor 4 and the fishing line guide hole 10, the bend angles experienced by the fishing line are eased (i.e. decreased). Whereas a conventional cover type fishing reel may require the fishing line to make 90° bends, a reel according to the present invention may ease the bend angles to 45° or less.

Figure 3:
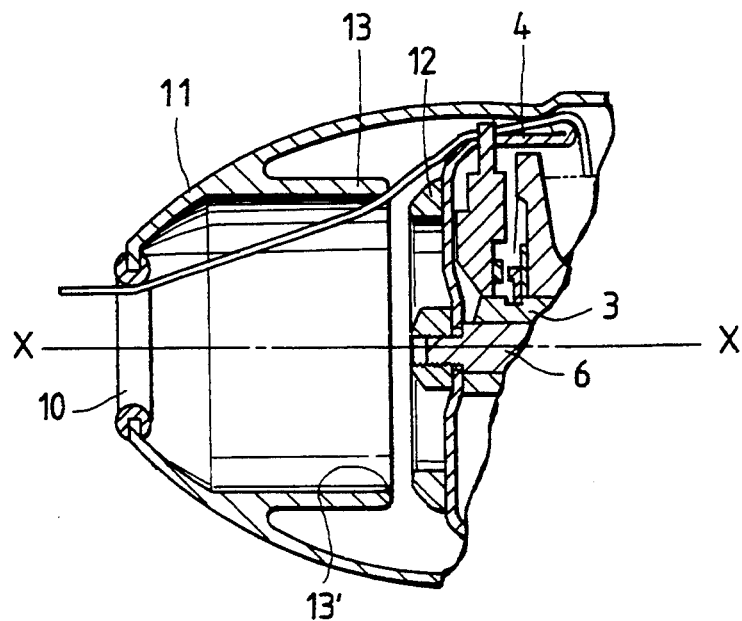
FIG. 3 is a sectional detail view showing another embodiment according to the present invention.
Figure 4:
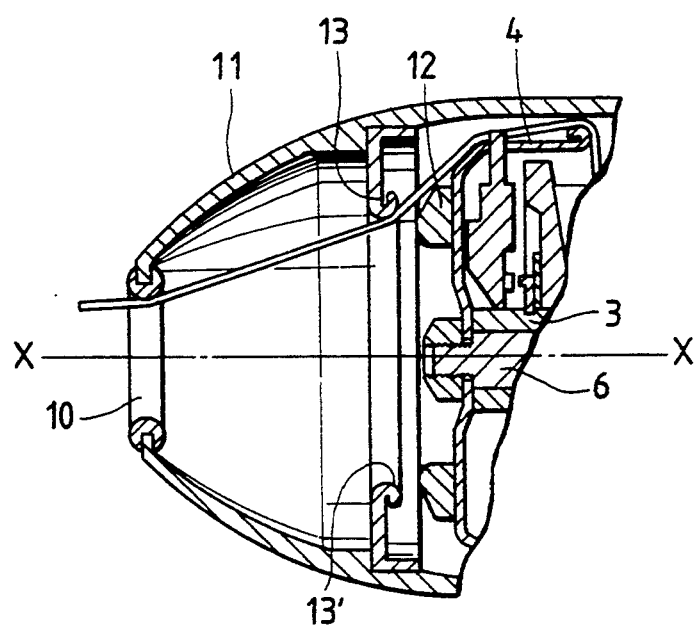
FIG. 4 is a sectional detail view showing yet another embodiment according to the present invention.

It will be readily appreciated that the annular fishing line engaging part 13 may be formed in a number of different manners. It may be integrally formed with the extended cover (FIG. 3), or it may be separately produced and subsequently attached to the extended cover (FIGS. 1, 2 and 4). It may be shaped like a disc (FIGS. 1 and 2), it may be tubular (FIG. 3), or it may have a complex shape (FIG. 4).

It will be noted that the present invention is not restricted to the embodiments described above, but may be modified in various ways without departing from the scope and spirit of the appended claims.

What is claimed is:

1. A cover type fishing reel comprising:
   a reel casing;
   an extended cover disconnectably mounted on said reel casing, said reel casing and said extended cover forming a pocket therebetween and said extended cover having a fishing line guide hole distal from said reel casing, said fishing line guide hole having a first diameter;
   a rotor having a second diameter, said rotor is movable in said pocket along and around an axis, said fishing line guide hole is aligned with said axis, wherein a distance along said axis between said rotor and said fishing line guide hole is greater than a dimension of said rotor along said axis;
   a fishing line pressing part disposed on said rotor, said pressing part defines a leading surface of the rotor and is disposed at an acute angle with respect to said axis;
   a cylindrical fishing line engaging part projecting into said pocket from said extended cover, said fishing line engaging part has a constant inside diameter which extends between a distal end and a proximal end with respect to said reel casing, said constant inside diameter being larger than said first diameter and smaller than said second diameter, said fishing line engaging part having, at said distal end, an engagement surface which is aligned with and confronts said leading surface of said fishing line pressing part; and
   a fishing line extending through a gap between said fishing line engaging part and said fishing line pressing part, said fishing line is bent and contiguously guided by said engagement surface, wherein translation by said rotor along said axis to close said gap grips said fishing line between said engagement surface and leading surface, wherein said leading surface is partially received within said cylindrical fishing line engaging part.

* * * * *